(12) United States Patent
Touati

(10) Patent No.: US 11,510,848 B2
(45) Date of Patent: Nov. 29, 2022

(54) DISPENSER FOR A COMPOSITION IN THE FORM OF POWDER IN A CONTAINER, AND CONTAINER OF THE FEEDING BOTTLE TYPE PROVIDED WITH SUCH A DISPENSER

(71) Applicant: AVA INC., Paris (FR)

(72) Inventor: Adrien Touati, Paris (FR)

(73) Assignee: AVA INC., Paris (FR)

( * ) Notice: Subject to any disclaimer, the term of this patent is extended or adjusted under 35 U.S.C. 154(b) by 744 days.

(21) Appl. No.: 16/494,497

(22) PCT Filed: Mar. 5, 2018

(86) PCT No.: PCT/FR2018/050491
§ 371 (c)(1),
(2) Date: Sep. 16, 2019

(87) PCT Pub. No.: WO2018/167395
PCT Pub. Date: Sep. 20, 2018

(65) Prior Publication Data
US 2020/0022872 A1   Jan. 23, 2020

(30) Foreign Application Priority Data
Mar. 16, 2017   (FR) ........................................ 1752173

(51) Int. Cl.
*A61J 1/20* (2006.01)
*A23C 9/18* (2006.01)
(Continued)

(52) U.S. Cl.
CPC .............. *A61J 1/2093* (2013.01); *A23C 9/18* (2013.01); *A61J 1/2031* (2015.05); *A61J 9/00* (2013.01); *A61J 11/04* (2013.01)

(58) Field of Classification Search
CPC ............................ A61J 1/2093; A61J 1/2031; A61J 9/00; A61J 11/04; A61J 9/008; A23C 9/18;
(Continued)

(56) References Cited

U.S. PATENT DOCUMENTS

| 2009/0178940 A1* | 7/2009 | Said .......................... A61J 9/00 215/11.1 |
| 2014/0061145 A1* | 3/2014 | Harris ..................... A61J 9/008 215/6 |

FOREIGN PATENT DOCUMENTS

WO    2015035647 A1    3/2015

OTHER PUBLICATIONS

International Search Report dated May 16, 2018, in corresponding International Application No. PCT/FR2018/050491; 4 pages.

* cited by examiner

*Primary Examiner* — John K Fristoe, Jr.
*Assistant Examiner* — Jessica Kavini Tamil
(74) *Attorney, Agent, or Firm* — Maier & Maier, PLLC

(57) ABSTRACT

A dispenser for a powder in a container, containing a receptacle including an end wall provided with at least one orifice, an adapter including a tubular body provided with a transverse partition provided with at least one orifice, the receptacle being rotatable on the adapter between a closed position of the dispenser, in which the orifice in the receptacle and the orifice in the adapter are not aligned with one another, and an open position of the dispenser, in which the orifice in the receptacle and the orifice in the adapter are positioned in line with one another, and a sealing component comprising an upper annular part and a lower annular part arranged so as to ensure sealing between the container and the adapter and between the adapter and the container, respectively, when the adapter is mounted on the container.

10 Claims, 5 Drawing Sheets

(51) Int. Cl.
*A61J 9/00* (2006.01)
*A61J 11/04* (2006.01)
(58) Field of Classification Search
CPC .......................... B65D 51/28; B65D 51/2807;
B65D 51/2857; B65D 81/3205; B65D 81/3211
USPC ........................................................ 604/416
See application file for complete search history.

DISPENSER FOR A COMPOSITION IN THE FORM OF POWDER IN A CONTAINER, AND CONTAINER OF THE FEEDING BOTTLE TYPE PROVIDED WITH SUCH A DISPENSER

FIELD

The invention relates to a dispenser for a composition being presented in the form of powder in a container as well as a container provided with such a dispenser.

The dispenser is intended, in particular, but not exclusively, to be implemented with a feeding bottle.

BACKGROUND

A dispenser of powder for a feeding bottle is known from application GB2489721, comprising a powder container and a connector to the feeding bottle wherein the connector comprises a coupling adapted to releasably fix the connector to a feeding bottle, and wherein the powder container is coupled so that it can be removed to the connector. The powder container comprises a baseplate defining one or more holes and the connector comprises a sealing plate defining one or more holes corresponding to the base element holes. The powder container is mounted rotatably with respect to the connector to define a closed angular configuration wherein the baseplate is located in the vicinity of the sealing plate and the hole(s) of the sealing plate is/are misaligned with the corresponding base element hole(s), such that the powder in the powder container is sealed there, and an open angular configuration wherein the two hole clearances are aligned to make it possible for the powder to flow outside of the powder container.

The dispenser of the abovementioned application however has a major disadvantage relating to the sealing of the assembly when the dispenser is mounted on the feeding bottle. This indeed does not have a reliable sealing between the connector and the feeding bottle with which it is coupled, due to the sealing being achieved only by the gripping of the neck of the feeding bottle in a channel arranged at the level of the wall of the adapter. Moreover, the sealing in the closed position of the dispenser between the connector and the powder container is also not totally ensured, this remaining dependent on the clamping of the powder container on the connector. It is indeed necessary that the powder container is sufficiently screwed, such that the sealing plate, wedged between the powder container and the connector ensures the sealing function thereof. An insufficient clamping can generate a clearance between the powder container and the container such that in case of unintended turning of the feeding bottle, the liquid contained in it comes into communication with the powder contained in the powder container.

SUMMARY

The invention aims to overcome this problem by proposing a dispenser of a powder composition, of which the sealing, when it is mounted on a container, is ensured.

The invention also aims for a dispenser that is simple to handle, which could be mounted and dismounted quickly and easily on a container and in particular on a feeding bottle and that is easy to clean.

The invention also aims to propose a dispenser comprising a reduced number of components.

The invention also aims to propose a container, like for example, a feeding bottle, provided with such a dispenser.

To this end, and according to a first aspect, the invention proposes a dispenser for a powder composition in a container, comprising a component forming a receptacle to contain the powder composition to be dispensed in the container, said component comprising an end wall provided with at least one orifice, a component forming an adapter comprising a tubular body provided with a transverse partition provided with at least one orifice and fixing means capable of engaging with complementary fixing means supported by the receptacle, the receptacle being rotatable on the adapter between a closed position of the dispenser, wherein the orifice of the receptacle and the orifice of the adapter are not aligned with one another and an open position of the dispenser wherein the orifice of the receptacle and the orifice of the adapter are positioned in line with one another so as to make it possible for the flow of the powder composition contained in the receptacle outside of the latter. The dispenser according to the invention is noteworthy in that it further comprises a sealing component comprising an upper annular part arranged to ensure sealing between the container and the adapter and a lower annular part arranged to ensure sealing between the adapter and the container when the adapter is mounted on the container.

Advantageously, the upper and lower annular parts are connected to one another by at least one connecting arms passing through the orifice of one of the components.

Advantageously, the sealing component forms a part overmoulded on one of the components.

Advantageously, the sealing component is supported by the adapter.

Advantageously, the upper annular part comprises a partition comprising at least one orifice located in line with the orifice of one of the components.

Advantageously, the partition comprises at least one protruding zone of complementary shape to the orifice of one of the components and arranged to be engaged in the orifice of the component located in line with which the zone is placed when the dispenser is in the closed position.

Advantageously, the receptacle is coupled reversibly with the adapter.

Advantageously, the receptacle comprises fixing means capable of engaging with complementary fixing means of an additional component, like for example, a lid or a ring for holding a teat when the container in question is a feeding bottle body.

The invention also relates to a container provided with a dispenser according to any one of the preceding claims.

The invention also relates to a feeding bottle to dispense a liquid comprising a feeding bottle body having, at one of the ends thereof, an opening, a dispenser according to any one of the preceding claims, coupled with said end of the feeding bottle body and a teat held on the dispenser by means of a retaining ring.

BRIEF DESCRIPTION OF THE FIGURES

Other aims and advantages of the invention will appear during the following description, made in reference to the appended drawings, wherein.

DETAILED DESCRIPTION OF THE FIGURES

Figures 1, 2:
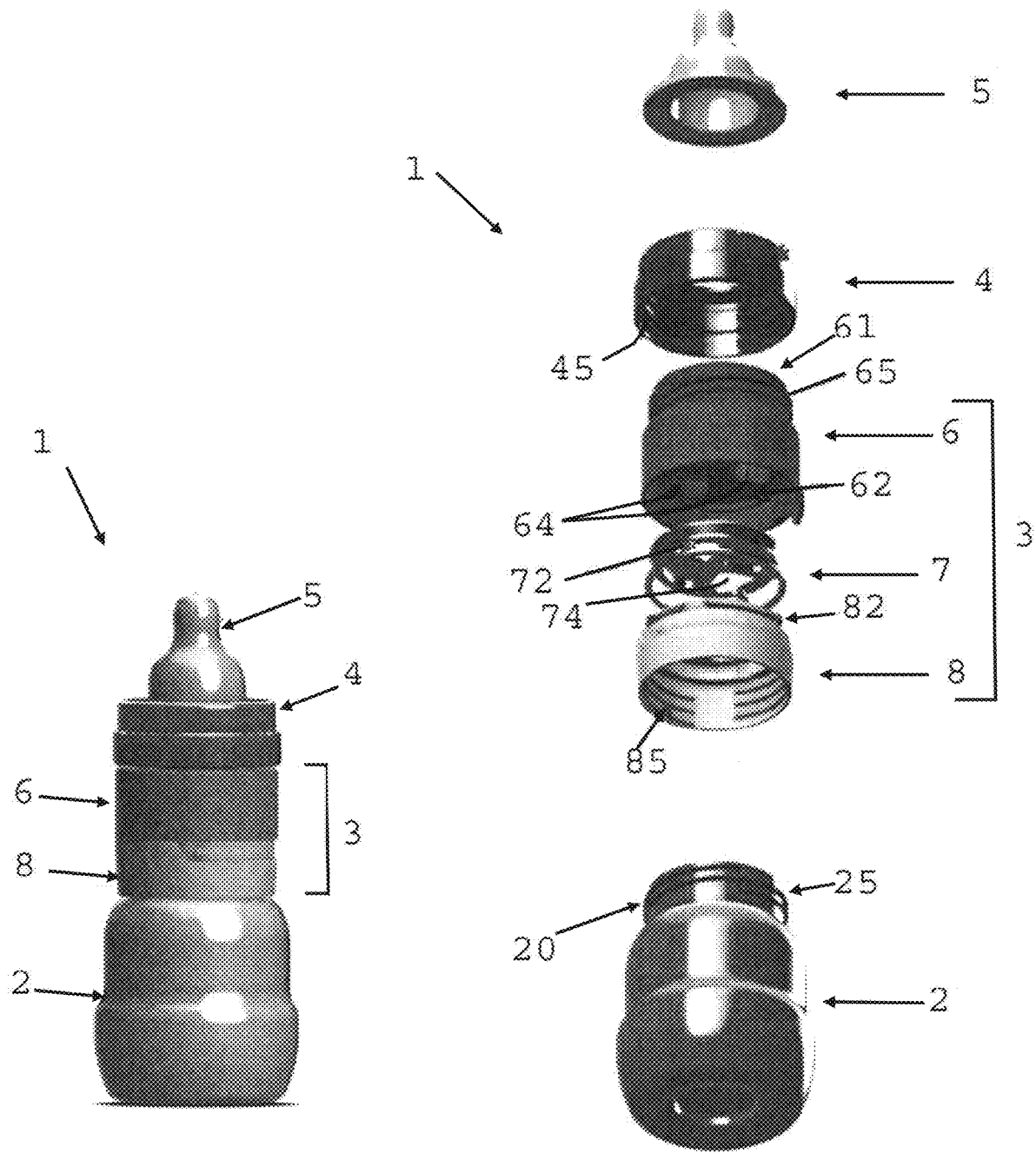
FIG. 1 represents a schematic view of a feeding bottle equipped with a dispenser for a powder composition according to the invention.
FIG. 2 represents an exploded view of the feeding bottle of FIG. 1.
Figure 3:
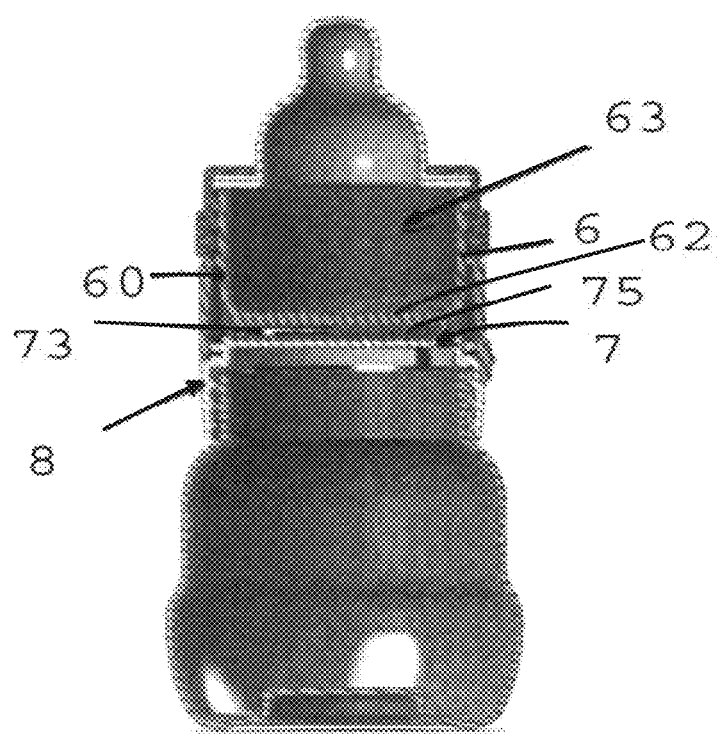
FIG. 3 represents a longitudinal cross-sectional view of the feeding bottle of FIG. 1.
Figure 4:
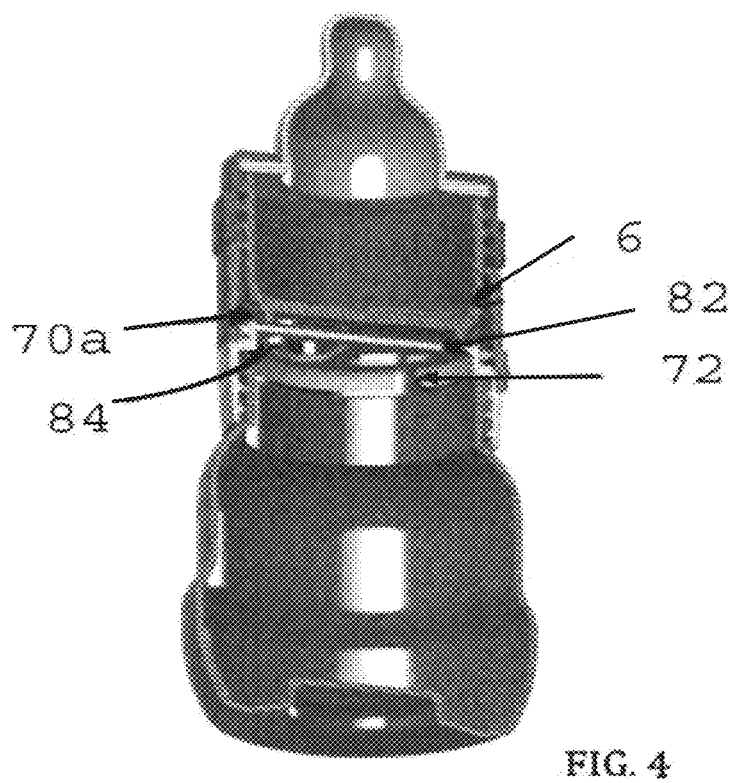
FIG. 4 represents a perspective, bottom view of the feeding bottle of FIG. 3.

Below, the terms "lower", "upper", "above", "below", "inner", "outer", referring to the orientation of the feeding bottle and to these components such as represented in the figures.

With respect to FIGS. 1 to 4, a feeding bottle 1 equipped with a dispenser 3 is described, making it possible for the dispensing of a determined quantity of milk powder.

The feeding bottle 1 comprises a feeding bottle body 2 intended to contain a liquid surmounted on the dispenser 3, a teat S coupled reversibly with the dispenser 3 via a holding ring 4.

The dispenser 3 comprises two components, one constituting a receptacle 6 to contain the milk powder to be dispensed in the body of the feeding bottle 2, the other component constituting an adapter 8 making it possible for the coupling of the receptacle to the body of the feeding bottle 2. The adapter can also and indifferently be designated as a connector.

In the embodiment illustrated, the receptacle 6, of substantially cylindrical shape, comprises a side wall 60, an open upper end 61 and an end wall 62.

The end wall 62 delimits, with the side wall 60 and the open upper end 61, a space 63 to receive the milk powder.

The end wall 62 is provided with several orifices 64. In the embodiment illustrated, the end wall 62 has two orifices 64 arranged symmetrically with one another with respect to the longitudinal axis of the dispenser 3. The orifices 64 have a substantially triangular shape. Of course, it is clear that orifices 64 can be provided which have other shapes, like in particular, a circular shape without moving away from the scope of the invention. As will however be understood later, the shape and the dimensions of the orifices will be selected so as to make it possible for a quick and easy flow of the powder contained in the receptacle 6.

Figure 9:
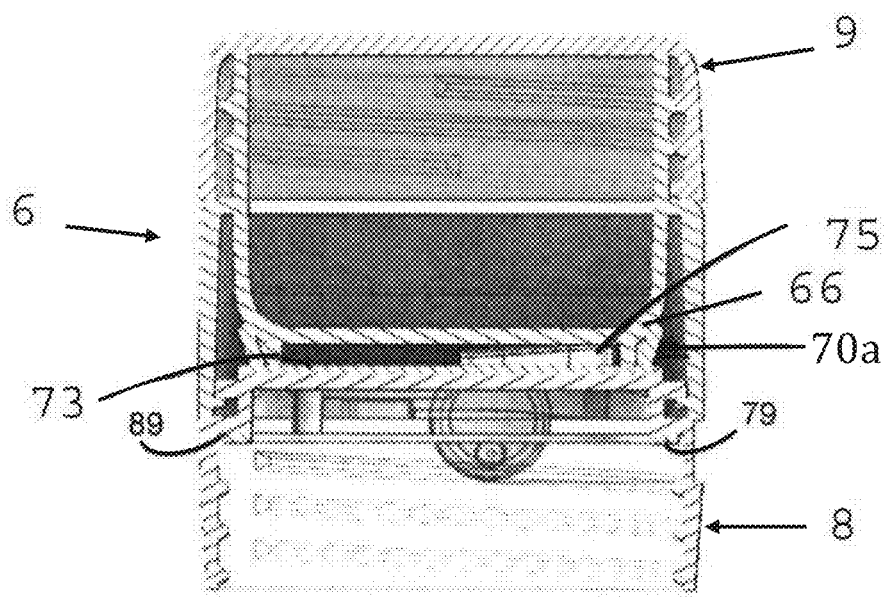
FIG. 9 represents a cross-sectional view of the dispenser illustrated in FIG. 1.
Figure 10:
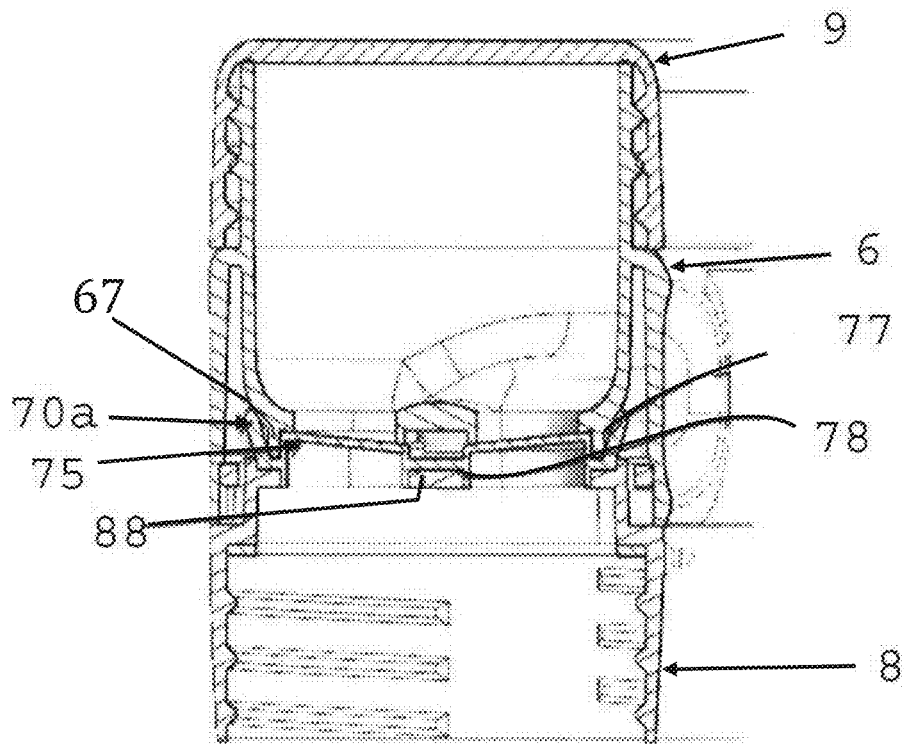
FIG. 10 represents a cross-sectional view of an embodiment variant of the dispenser of FIG. 9.

The receptacle 6 comprises an upper end portion supporting, on the outer face thereof, a helical thread 65. The helical thread 65 is arranged to engage with the threading 45 arranged on the inner face of the ring for holding 4 the teat. The teat 5 is thus fixed on the receptacle 6, on the side of the open upper end 61, by screwing the holding ring 4 on the upper end portion of the receptacle 6. It can be provided also that the dispenser is provided with a lid 9 comprising means for complementary coupling to the helical threading 65 of the receptacle as illustrated in FIGS. 9 and 10.

The adapter 8 comprises a tubular body having an upper end provided with a transverse partition 82. Like the end wall 62 of the receptacle 6, the partition of the adapter 8 comprises orifices 84. In the embodiment illustrated, the partition 82 is provided with four orifices 84. These orifices 84 are distributed over the partition so as to correspond to the two orifices 64 of the end wall 62 of the receptacle when the dispenser 3 is in a position called open position, described later. Said orifices 84 furthermore and advantageously have a shape corresponding to that of the orifices 64 of the end wall 62 of the receptacle 6.

The adapter 8 further comprises means making it possible for a reversible coupling on the feeding bottle body 2. More specifically, the adapter 8 comprises coupling means capable of engaging with complementary coupling means supported by the container. In the embodiment illustrated, the coupling means consist of a helical threading 85 arranged on the inner face of the lower end portion of the adapter 8, said helical threading 85 being arranged to engage with the helical thread 25 arranged on the outer face of the upper end portion 20 of the feeding bottle body 2.

Figure 5:
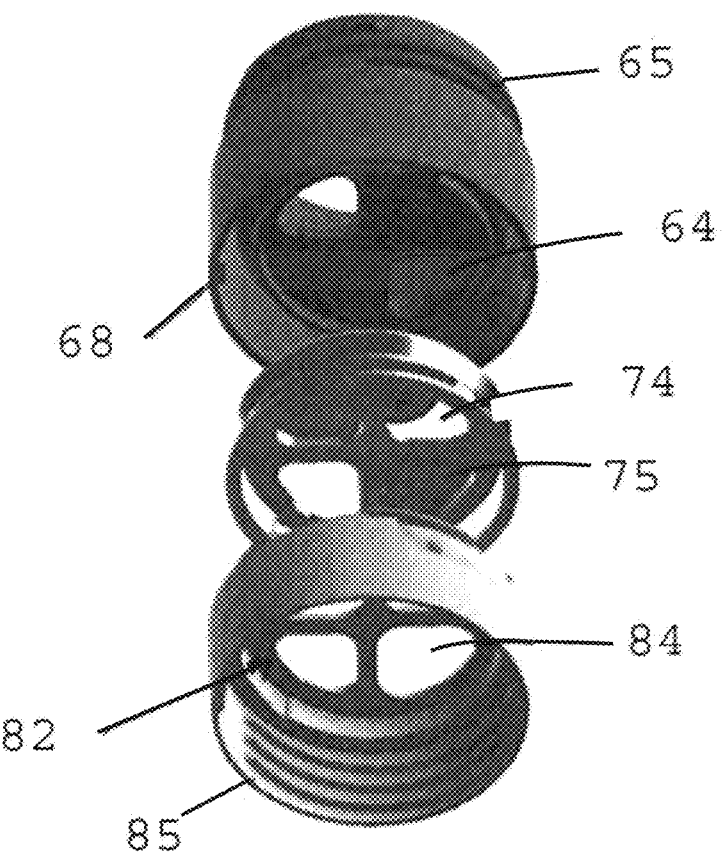
FIG. 5 represents an exploded, bottom view of the dispenser equipping the feeding bottle of FIG. 1.
Figure 6:
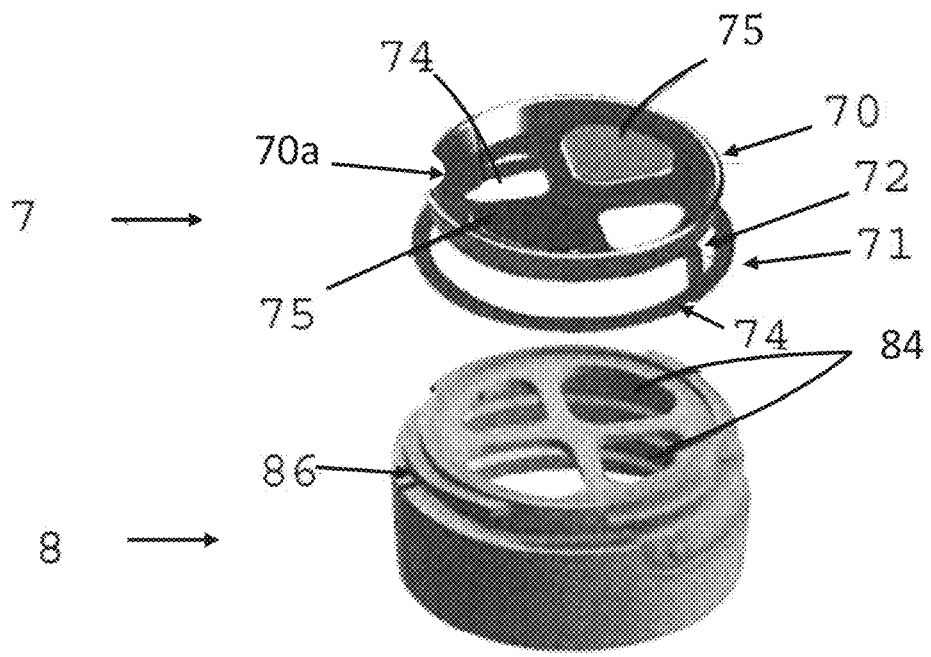
FIG. 6 represents an exploded, top view of the adapter.

The receptacle 6 is coupled reversibly to the adapter 8. The coupling means are arranged to make it possible for the rotation of the receptacle 6 with respect to the adapter 8 between a position called closed position (position wherein the receptacle 6 is fully screwed on the adapter 8 and the orifices 64 of the receptacle 6 and the orifices 84 of the adapter 8 are not aligned with one another), a position called open position (position wherein the orifices 64 of the receptacle 6 and the orifices 84 of the adapter 8 are positioned opposite one another so as to make it possible for the flow of the milk powder contained in the receptacle 6 in the feeding bottle body) and a position wherein the receptacle 6 is uncoupled from the adapter 8. In the embodiment illustrated, the coupling means comprise extensions 86 arranged on the upper end portion of the adapter 8 and arranged to form a discontinuous helical guiding ramp and one or more pin(s) arranged 68 on the lower end portion of the receptacle 6 (FIGS. 5 and 6). At least one of the extensions is provided, in the top part of the ramp, of a stop pad arranged to block the receptacle in the opening position.

Figure 7:
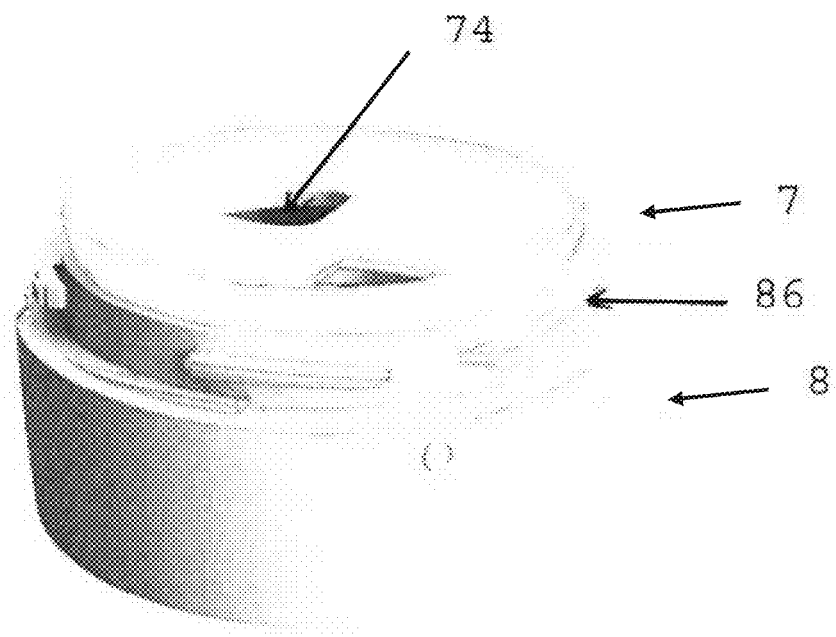
FIG. 7 represents a top view of the adapter equipped with the sealing component.
Figure 8:
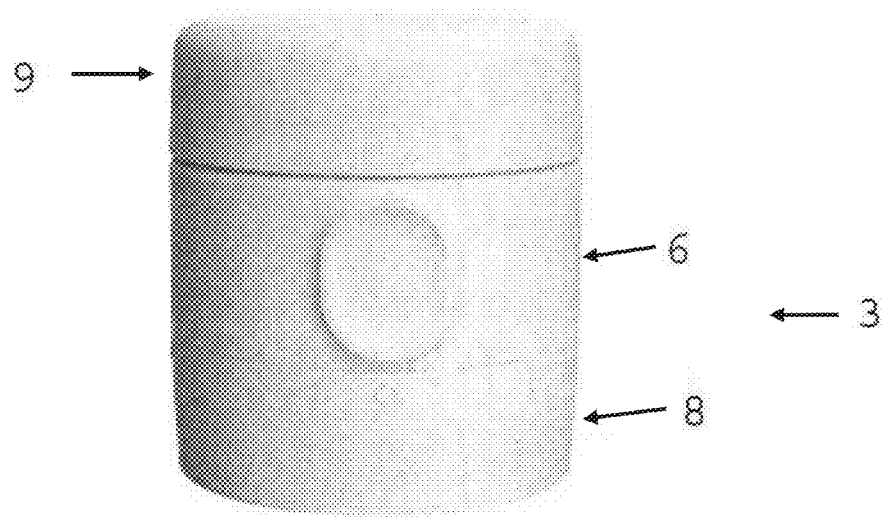
FIG. 8 represents the dispenser equipped with a lid.

The dispenser 3 further comprises a sealing component 7 intended to together ensure the sealing, even of the dispenser 3 (sealing between the receptacle 6 and the adapter 8) and the sealing between the adapter 8 and the feeding bottle body 2. In the embodiment illustrated, the sealing component 7 is supported by the adapter 8 and more specifically overmoulded on the adapter 8 (FIG. 7).

The sealing component 7 comprises an upper annular part 70 and a lower annular part 71 connected to one another by connecting arms 72. As illustrated in FIG. 7, each connecting arm 72 extends through one of the orifices 84 of the partition of the adapter 8. In the embodiment illustrated, the upper and lower annular parts 70, 71 are connected by two diametrically opposite connecting arms 72.

The upper annular part 70 is arranged to ensure sealing between the container 6 and the adapter 8. It is provided with a partition 73 (or plate) comprising two orifices 74 located respectively in line with one of the orifices 84 of the adapter 8. As FIG. 6 shows, said orifices 74 of the annular part 70 are arranged symmetrically in line with one another to the longitudinal axis of the dispenser 3, and have an identical shape to the orifices 84 of the adapter 84 in line with which they are positioned.

The partition 73 further comprises, on the upper face thereof, two protruding zones 75 arranged symmetrically in line with one another with respect to the longitudinal axis of the dispenser 3 and inserted between the orifices 74. These are advantageously zones raised with material. Said zones 75 advantageously have a shape complementarily to the orifice 64 of the receptacle 6 in line with which they are arranged. They are arranged to respectively block the orifice 64 of the receptacle 6 in line with which they are positioned when the dispenser 3 is in the closed position. The presence of zones thus raised thus makes it possible to reinforce the sealing between the receptacle 6 and the adapter 8.

The upper annular part 70 furthermore has a supporting edge 70a extending above the partition, and arranged to bear against the lower end portion 66 of the receptacle 6. The upper part of the sealing component 7 is thus presented in the form of a cup.

The lower annular part 71 is arranged to ensure sealing between the adapter 8 and the container 6 when the adapter 8 is mounted on the feeding bottle body 2. The lower annular part 72 is arranged to form a collar 79 having an upper surface bearing against a shoulder 89 arranged on the inner wall of the adapter 8 (FIG. 9).

The connecting arms 72 are bent so as to border the faces of the receptacle 6 and of the adapter 8 against which they bear.

FIG. 10 illustrates an embodiment variant of the dispenser. In the embodiment illustrated, the dispenser is represented as provided with a lid 9. In this embodiment, the zone protruding 75 from the upper annular part 70 are arranged with the edge 70a so as to define a circular groove 77 receiving a circular extension 67 arranged at the lower end of the receptacle 6 in the closing position.

Advantageously, the transverse partition 82 of the adapter 8 comprises a central lug 88 capable of being housed in a central housing 78 arranged on the lower front side of the partition 73 of the sealing component.

The invention is described above as an example. It is understood that a person skilled in the art is able to achieve different embodiment variants of the invention without moving away from the scope of the invention.

The invention claimed is:

1. Dispenser for a powder composition in a container, comprising: a component forming a receptacle to contain the powder composition to be dispensed in the container, said component comprising an end wall provided with at least one orifice, a component forming an adapter comprising a tubular body provided with a transverse partition provided with at least one orifice and fixing means capable of engaging with complementary fixing means supported by the receptacle, the receptacle being rotatable on the adapter between a closed position of the dispenser, wherein the orifice of the receptable and the orifice of the adapter are not aligned with one another and an open position of the dispenser, wherein the orifice of the receptable and the orifice of the adapter are positioned in line with one another so as to make it possible for the flow of the powder composition contained in the receptacle outside of the latter, characterised in that the dispenser further comprises a sealing component comprising an upper annular part arranged to ensure sealing between the container and the adapter and a lower annular part arranged to ensure sealing between the adapter and the container when the adapter is mounted on the container.

2. Dispenser according to claim 1, wherein the upper and lower annular parts are connected to one another by at least one connecting arm passing through the orifice of one of the components.

3. Dispenser according to claim 1, wherein the sealing component forms a part overmoulded on one of the components.

4. Dispenser according to claim 1, wherein the sealing component is supported by the adapter.

5. Dispenser according to claim 1, wherein the upper annular part comprises a partition comprising at least one orifice located in line with the orifice of one of the components.

6. Dispenser according to claim 5, wherein the partition comprises at leak one protruding zone of shape complementary to the orifice of one of the components and arranged to be engaged in the orifice of the component located in line with which the zone is placed when the dispenser is in a closed position.

7. Dispenser according to claim 1, wherein the receptacle is coupled reversibly with the adapter.

8. Dispenser according to claim 1, wherein the receptacle comprises fixing means capable of engaging with complementary fixing means of an additional component.

9. Dispenser according to claim 1, further comprising a container coupled thereto.

10. Feeding bottle to dispense a liquid comprising a feeding battle body having, at one of the ends thereof, an opening, a dispenser according to claim 1, coupled with said end of the feeding bottle body and a teat held on the dispenser by means of a holding ring.

* * * * *